(12) United States Patent
Chun et al.

(10) Patent No.: US 8,687,565 B2
(45) Date of Patent: *Apr. 1, 2014

(54) METHOD OF EFFECTIVELY TRANSMITTING RADIO RESOURCE ALLOCATION REQUEST IN MOBILE COMMUNICATION SYSTEM

(75) Inventors: Sung-Duck Chun, Gyeonggi-Do (KR); Young-Dae Lee, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 991 days.

This patent is subject to a terminal disclaimer.

(21) Appl. No.: 12/234,574

(22) Filed: Sep. 19, 2008

(65) Prior Publication Data

US 2009/0080380 A1  Mar. 26, 2009

Related U.S. Application Data

(60) Provisional application No. 60/974,072, filed on Sep. 20, 2007, provisional application No. 60/975,582, filed on Sep. 27, 2007, provisional application No. 60/976,766, filed on Oct. 1, 2007, provisional application No. 61/039,095, filed on Mar. 24, 2008.

(30) Foreign Application Priority Data

Sep. 18, 2008 (KR) ........................ 10-2008-0091724

(51) Int. Cl.
*H04W 4/00* (2009.01)

(52) U.S. Cl.
USPC ........... 370/329; 370/474; 370/342; 370/476; 370/236

(58) Field of Classification Search
USPC ........................................................ 370/329
See application file for complete search history.

(56) References Cited

U.S. PATENT DOCUMENTS 5,878,041 A    3/1999  Yamanaka et al.
6,445,917 B1   9/2002  Bark et al.
(Continued)

FOREIGN PATENT DOCUMENTS

CN    1314747    9/2001
CN    1339903    3/2002
(Continued)

OTHER PUBLICATIONS

Wang, P.S., et al., "Operation of Control Protocol Data Units in Packet Data Convergence Protocol", U.S. Appl. No. 60/976,139, filed Sep. 28, 2007.

(Continued)

*Primary Examiner* — Ayaz Sheikh
*Assistant Examiner* — Hai-Chang Hsiung
(74) *Attorney, Agent, or Firm* — Lee, Hong, Degerman, Kang & Waimey

(57) ABSTRACT

A method allowing a terminal with data to be transmitted in an uplink direction to transmit a radio resource allocation request message to a base station by effectively using radio resource(s) to its maximum level is disclosed. In particular, the method allows the terminal to select a radio resource allocation request message of a proper format according to a situation of radio resource(s) or the amount of data of each channel and transmit the same to the base station.

7 Claims, 8 Drawing Sheets short buffer status MAC control element normal buffer status MAC control element

(56) References Cited

U.S. PATENT DOCUMENTS

| | | |
|---|---|---|
| 6,557,135 B1 | 4/2003 | Balachandran et al. |
| 6,594,240 B1 | 7/2003 | Chuah et al. |
| 6,594,244 B1 | 7/2003 | Chang et al. |
| 6,628,946 B1 | 9/2003 | Wiberg et al. |
| 6,728,918 B1 | 4/2004 | Ikeda et al. |
| 6,738,624 B1 | 5/2004 | Aksentijevic et al. |
| 6,788,944 B2 | 9/2004 | Jiang |
| 6,862,450 B2 | 3/2005 | Mikola et al. |
| 6,874,113 B2 | 3/2005 | Chao et al. |
| 6,967,936 B1 | 11/2005 | Laroia et al. |
| 6,987,985 B2 | 1/2006 | Purkayastha et al. |
| 7,009,940 B2 | 3/2006 | Vialen et al. |
| 7,171,163 B2 | 1/2007 | Terry et al. |
| 7,180,885 B2 | 2/2007 | Terry |
| 7,181,667 B2 | 2/2007 | Argyropoulos et al. |
| 7,227,856 B2 | 6/2007 | Wu |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 * | 4/2010 | Chun et al. ............ 370/474 |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,321 B2 | 9/2011 | Zheng |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 8,270,348 B2 | 9/2012 | Chun et al. |
| 8,351,388 B2 | 1/2013 | Chun et al. |
| 2001/0031638 A1 | 10/2001 | Korpela et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0008659 A1 | 1/2004 | Kim |
| 2004/0022213 A1 | 2/2004 | Choi et al. |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0147236 A1 | 7/2004 | Parkvall et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2004/0208160 A1 | 10/2004 | Petrovic et al. |
| 2004/0223507 A1 | 11/2004 | Kuchibhotla et al. |
| 2004/0229626 A1 | 11/2004 | Yi et al. |
| 2004/0235447 A1 | 11/2004 | Gronberg et al. |
| 2005/0020260 A1 | 1/2005 | Jeong et al. |
| 2005/0020620 A1 | 1/2005 | Weigl et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen |
| 2005/0094596 A1 | 5/2005 | Pietraski et al. |
| 2005/0096017 A1 | 5/2005 | Kim |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0237960 A1 | 10/2005 | Kim |
| 2005/0238051 A1 | 10/2005 | Yi et al. |
| 2005/0249141 A1 | 11/2005 | Lee et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0007886 A1 | 1/2006 | Lee et al. |
| 2006/0030342 A1 | 2/2006 | Hwang et al. |
| 2006/0056441 A1 | 3/2006 | Jiang |
| 2006/0062237 A1 | 3/2006 | Kim |
| 2006/0067238 A1 | 3/2006 | Olsson et al. |
| 2006/0067289 A1 | 3/2006 | Lee et al. |
| 2006/0067361 A1 | 3/2006 | Lee et al. |
| 2006/0067364 A1 | 3/2006 | Jung et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0098574 A1 | 5/2006 | Yi et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0274690 A1 | 12/2006 | Chun et al. |
| 2006/0280145 A1 | 12/2006 | Revel et al. |
| 2006/0281456 A1 | 12/2006 | Roberts et al. |
| 2007/0041397 A1 | 2/2007 | Hwang |
| 2007/0047452 A1 | 3/2007 | Lohr et al. |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 | 4/2007 | Torsner |
| 2007/0091810 A1 | 4/2007 | Kim et al. |
| 2007/0097913 A1 | 5/2007 | Hanov |
| 2007/0104141 A1 | 5/2007 | Park et al. |
| 2007/0117579 A1 | 5/2007 | Cai et al. |
| 2007/0133456 A1 | 6/2007 | Ding |
| 2007/0177628 A1 | 8/2007 | Choi et al. |
| 2007/0178878 A1 | 8/2007 | Ding |
| 2007/0183358 A1 | 8/2007 | Cai |
| 2007/0189205 A1 | 8/2007 | Terry et al. |
| 2007/0201397 A1 * | 8/2007 | Zhang ............ 370/329 |
| 2007/0206530 A1 | 9/2007 | Lee et al. |
| 2007/0223526 A1 | 9/2007 | Jiang |
| 2007/0258591 A1 | 11/2007 | Terry et al. |
| 2007/0268861 A1 | 11/2007 | Diachina et al. |
| 2007/0274278 A1 | 11/2007 | Choi et al. |
| 2007/0287440 A1 | 12/2007 | Benkert et al. |
| 2007/0297360 A1 | 12/2007 | Joachim et al. |
| 2007/0297367 A1 | 12/2007 | Wang et al. |
| 2008/0002688 A1 | 1/2008 | Kim et al. |
| 2008/0008152 A1 * | 1/2008 | Lohr et al. ............ 370/342 |
| 2008/0043658 A1 | 2/2008 | Worrall |

(56) References Cited

U.S. PATENT DOCUMENTS

| | | | |
|---|---|---|---|
| 2008/0043670 A1* | 2/2008 | Marinier | 370/329 |
| 2008/0045224 A1 | 2/2008 | Lu et al. | |
| 2008/0045272 A1 | 2/2008 | Wang et al. | |
| 2008/0049682 A1 | 2/2008 | Ding et al. | |
| 2008/0051098 A1 | 2/2008 | Rao | |
| 2008/0059859 A1 | 3/2008 | Marinier et al. | |
| 2008/0069108 A1 | 3/2008 | Yi et al. | |
| 2008/0081598 A1 | 4/2008 | Chandra et al. | |
| 2008/0084851 A1* | 4/2008 | Kim et al. | 370/336 |
| 2008/0089285 A1 | 4/2008 | Pirskanen et al. | |
| 2008/0101609 A1 | 5/2008 | Jiang | |
| 2008/0146242 A1 | 6/2008 | Alanara et al. | |
| 2008/0165717 A1 | 7/2008 | Chen et al. | |
| 2008/0165755 A1 | 7/2008 | Marinier et al. | |
| 2008/0182609 A1 | 7/2008 | Somasundaram et al. | |
| 2008/0186936 A1 | 8/2008 | Chun et al. | |
| 2008/0186944 A1 | 8/2008 | Suzuki et al. | |
| 2008/0186946 A1 | 8/2008 | Marinier et al. | |
| 2008/0198869 A1 | 8/2008 | Jiang | |
| 2008/0212561 A1 | 9/2008 | Pani et al. | |
| 2008/0212605 A1 | 9/2008 | Jiang | |
| 2008/0232396 A1 | 9/2008 | Buckley et al. | |
| 2008/0233940 A1 | 9/2008 | Jen | |
| 2008/0233941 A1 | 9/2008 | Jen | |
| 2008/0261581 A1 | 10/2008 | Cai | |
| 2008/0268878 A1 | 10/2008 | Wang et al. | |
| 2008/0273482 A1 | 11/2008 | Lee et al. | |
| 2008/0273610 A1 | 11/2008 | Malladi et al. | |
| 2008/0318566 A1 | 12/2008 | Chun et al. | |
| 2008/0318578 A1 | 12/2008 | Worrall | |
| 2009/0005058 A1 | 1/2009 | Kazmi et al. | |
| 2009/0016301 A1 | 1/2009 | Sammour et al. | |
| 2009/0041240 A1 | 2/2009 | Parkvall et al. | |
| 2009/0046631 A1 | 2/2009 | Meylan et al. | |
| 2009/0046667 A1 | 2/2009 | Pelletier et al. | |
| 2009/0046695 A1 | 2/2009 | Jiang | |
| 2009/0104890 A1 | 4/2009 | Wang et al. | |
| 2009/0116434 A1 | 5/2009 | Lohr et al. | |
| 2009/0119564 A1 | 5/2009 | Sagfors et al. | |
| 2009/0156194 A1 | 6/2009 | Meylan | |
| 2009/0175163 A1 | 7/2009 | Sammour et al. | |
| 2009/0175253 A1 | 7/2009 | Wu et al. | |
| 2009/0190480 A1 | 7/2009 | Sammour et al. | |
| 2009/0232076 A1 | 9/2009 | Kuo | |
| 2009/0259908 A1 | 10/2009 | Gollapudi | |
| 2009/0305712 A1 | 12/2009 | Franceschini et al. | |
| 2010/0014466 A1 | 1/2010 | Meyer et al. | |
| 2010/0091750 A1 | 4/2010 | Lee et al. | |
| 2010/0128648 A1 | 5/2010 | Lee et al. | |
| 2010/0142429 A1 | 6/2010 | Yi et al. | |
| 2010/0142457 A1 | 6/2010 | Chun et al. | |
| 2010/0157904 A1 | 6/2010 | Ho et al. | |
| 2010/0232335 A1 | 9/2010 | Lee et al. | |
| 2010/0260140 A1 | 10/2010 | Zhu | |
| 2011/0019604 A1 | 1/2011 | Chun et al. | |
| 2011/0033048 A1 | 2/2011 | Stanwood et al. | |
| 2011/0149865 A1 | 6/2011 | Lee et al. | |

FOREIGN PATENT DOCUMENTS

| | | |
|---|---|---|
| CN | 1349360 | 5/2002 |
| CN | 1396780 | 2/2003 |
| CN | 1549610 | 11/2004 |
| CN | 1613210 | 5/2005 |
| CN | 1642067 | 7/2005 |
| CN | 1643820 | 7/2005 |
| CN | 1761260 | 4/2006 |
| CN | 1761356 | 4/2006 |
| CN | 1792048 | 6/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 101047966 | 10/2007 |
| CN | 101090281 | 12/2007 |
| CN | 101690375 | 9/2012 |
| EP | 1263160 | 12/2002 |
| EP | 1286564 | 2/2003 |
| EP | 1326397 | 7/2003 |
| EP | 1343267 A2 | 9/2003 |
| EP | 1508992 | 2/2005 |
| EP | 1509011 | 2/2005 |
| EP | 1638237 | 3/2006 |
| EP | 1689130 A1 | 8/2006 |
| EP | 1746855 A2 | 1/2007 |
| EP | 1768297 A2 | 3/2007 |
| EP | 1771024 | 4/2007 |
| EP | 1796405 | 6/2007 |
| EP | 2026523 | 2/2009 |
| EP | 2163006 | 3/2012 |
| JP | 06-053921 | 2/1994 |
| JP | 1995162948 | 6/1995 |
| JP | 2000-324161 | 11/2000 |
| JP | 2001-197021 | 7/2001 |
| JP | 2001197021 | 7/2001 |
| JP | 2002-198895 | 7/2002 |
| JP | 2003-018050 | 1/2003 |
| JP | 2003-115796 | 4/2003 |
| JP | 2003115876 | 4/2003 |
| JP | 2003516021 | 5/2003 |
| JP | 2003229925 | 8/2003 |
| JP | 2003-283592 | 10/2003 |
| JP | 2005-073276 | 3/2005 |
| JP | 2006-054718 | 2/2006 |
| JP | 2006-505209 | 2/2006 |
| JP | 2006505209 | 2/2006 |
| JP | 2006-514466 | 4/2006 |
| JP | 2006-121562 | 5/2006 |
| JP | 2006311543 | 11/2006 |
| JP | 2007116639 | 5/2007 |
| JP | 2007312244 | 11/2007 |
| JP | 2008-520125 | 6/2008 |
| JP | 2009-513058 | 3/2009 |
| JP | 2009521893 | 6/2009 |
| JP | 2010-518683 | 5/2010 |
| KR | 10-2001-0045783 | 6/2001 |
| KR | 2001-045783 | 6/2001 |
| KR | 10-2001-0062306 | 7/2001 |
| KR | 2002-0004645 | 1/2002 |
| KR | 10-2002-0097304 A | 12/2002 |
| KR | 10-2003-0012048 A | 2/2003 |
| KR | 2003-0060055 | 7/2003 |
| KR | 1020030060055 A | 7/2003 |
| KR | 10-2003-0068743 | 8/2003 |
| KR | 10-2003-0068743 A | 8/2003 |
| KR | 1020030087914 | 11/2003 |
| KR | 10-2004-0034398 | 4/2004 |
| KR | 1020040034398 A | 4/2004 |
| KR | 20040039944 A | 5/2004 |
| KR | 10-2004-0072961 | 8/2004 |
| KR | 1020050022988 A | 3/2005 |
| KR | 10-2005-0062359 A | 6/2005 |
| KR | 10-2005-0081836 | 8/2005 |
| KR | 10-2005-0092874 A | 9/2005 |
| KR | 10-2005-0099472 | 10/2005 |
| KR | 10-2005-0100882 | 10/2005 |
| KR | 10-2005-0103127 | 10/2005 |
| KR | 1020050103127 | 10/2005 |
| KR | 10-2006-0004935 | 1/2006 |
| KR | 1020060004935 | 1/2006 |
| KR | 10-2006-0014910 | 2/2006 |
| KR | 10-2006-0029452 | 4/2006 |
| KR | 1020060042858 A | 5/2006 |
| KR | 1020060069378 A | 6/2006 |
| KR | 1020060079784 A | 7/2006 |
| KR | 10-2006-0090191 | 8/2006 |
| KR | 1020060090191 A | 8/2006 |
| KR | 1020060134058 A | 12/2006 |
| KR | 10-2007-0076374 | 7/2007 |
| KR | 10-0907978 | 7/2009 |
| KR | 10-2009-0084756 | 8/2009 |
| RU | 2304348 | 8/2007 |

(56) References Cited

FOREIGN PATENT DOCUMENTS

| | | |
|---|---|---|
| TW | 496058 | 7/2002 |
| WO | 0137473 | 5/2001 |
| WO | 01/67664 | 9/2001 |
| WO | 02/45453 | 6/2002 |
| WO | 03045103 | 5/2003 |
| WO | 2004/042953 | 5/2004 |
| WO | 2004/042963 | 5/2004 |
| WO | 2004/102838 | 11/2004 |
| WO | 2005/022814 | 3/2005 |
| WO | 2005039108 A2 | 4/2005 |
| WO | 2005/078967 | 8/2005 |
| WO | 2005/079105 | 8/2005 |
| WO | 2005/109671 | 11/2005 |
| WO | 2005/122441 | 12/2005 |
| WO | 2005125226 A2 | 12/2005 |
| WO | 2006009714 | 1/2006 |
| WO | 2006/016785 | 2/2006 |
| WO | 2006/033521 | 3/2006 |
| WO | 2006/052086 | 5/2006 |
| WO | 2006046894 A1 | 5/2006 |
| WO | 2006/075820 | 7/2006 |
| WO | 2006083149 | 8/2006 |
| WO | 2006/095385 | 9/2006 |
| WO | 2006/104335 | 10/2006 |
| WO | 2006/104342 | 10/2006 |
| WO | 2006/104773 | 10/2006 |
| WO | 2006/116620 | 11/2006 |
| WO | 2006/118435 | 11/2006 |
| WO | 2006118418 A2 | 11/2006 |
| WO | 2007/020070 | 2/2007 |
| WO | 2007/023364 | 3/2007 |
| WO | 2007/024065 | 3/2007 |
| WO | 2007/045505 | 4/2007 |
| WO | 2007039023 A1 | 4/2007 |
| WO | 2007/052900 | 5/2007 |
| WO | 2007/052921 | 5/2007 |
| WO | 2007066900 A1 | 6/2007 |
| WO | 2007/078156 | 7/2007 |
| WO | 2007/078174 | 7/2007 |
| WO | 2007/079085 | 7/2007 |
| WO | 2007078142 A1 | 7/2007 |
| WO | 2007078164 A1 | 7/2007 |
| WO | 2007078173 A1 | 7/2007 |
| WO | 2007/089797 | 8/2007 |
| WO | 2007/091831 | 8/2007 |
| WO | 2007/126793 | 11/2007 |
| WO | 2007/147431 | 12/2007 |
| WO | WO 2007147431 A1 * | 12/2007 |
| WO | 2008/004725 | 1/2008 |
| WO | 2008/010063 | 1/2008 |
| WO | 2008/094120 | 8/2008 |
| WO | 2009/035301 | 3/2009 |

OTHER PUBLICATIONS

Mukherjee, R.P., et al., "Method and Apparatus of Performing Packet Data Convergence Protocol Reset", U.S. Appl. No. 61/019,058, filed Jan. 4, 2008.
Abeta et al. "Super 3G Technology Trends. Part 2: Research on Super 3G Technology", NTT DoCoMo Tech Journal, vol. 8, No. 3, p. 55-62, Dec. 2006.
Nokia "System Information Distribution", 3GPP TSG-RAN WG2 AdHoc Meeting on LTE, R2-06148, Jun. 2006.
LG Electronics "Deliver of LTE System Information", 3GPP TSG-RAN WG2 Ad Hoc on LTE, Rs-061959, Jun. 2006.
Ghosh, A. et al.; "Random Access Design for UMTS Air-Interface Evolution"; Vehicular Technology Conference, 2007. VTC 2007—Spring. IEEE 65th; Apr. 22-25, 2007; pp. 1041-1045.
3rd Generation Partnership Project (3GPP) Organizational Partners; "3rd Generation Partnership Project; Technical Specification Group Radio Access Network; User Equipment (UE) procedures in idle mode and procedures for cell reselection in connected mode (Release 8)"; Technical Specification; 3GPP TS 25.304 V8.0.0 (Dec. 2007).
LG Electronics, Inc., "Correction to HCS"; 3GPP TSG-RAN WG2 #61bis; R2-081566; XP050139301; Mar. 31, 2008.
Ericsson, Nokia Corporation, Nokia Siemens Networks, Qualcomm Europe, Samsung, NTT DoCoMo Inc., "Framework for Scheduling Request and Buffer Status Reporting," R2-074691, 3GPP TSG-RAN WG2 Meeting #60, Nov. 5, 2007.
Motorola, "Synchronized Random Access Channel and Scheduling Request," R1-063046, 3GPP TSG-RAN 1 #47, Nov. 6, 2006.
Ericsson, "Basic Principles for the Scheduling Request in LTE," R2-062350, 3GPP TSG-RAN WG2 #54, Aug. 28, 2006.
NTT DoCoMo, Fujitsu, Mitsubishi Electric, NEC, Sharp, Toshiba Corporation, "Scheduling Request Transmission Method for E-UTRA Uplink," R1-063301, 3GPP TSG-RAN WG1 Meeting #47, Nov. 6, 2006.
Ericsson, "Scheduling Request in E-UTRAN," R1-070471, 3GPP TSG-RAN WG2 #47bis, Jan. 15, 2007.
LG Electronics Inc., "UE State Transition in LTE_ACTIVE," R2-061002, 3GPP TSG-RAN WG2 #52, Mar. 2006, XP-050130928.
Texas Instruments, "UL Synchronization Management and Maintenance in E-UTRA," R1-072198, 3GPP TSG RAN WG1 #49, May 2007, XP-050105936.
Texas Instruments, "UL Synchronization Management in LTE_ACTIVE," R1-071478, 3GPP TSG RAN WG1 #48bis, Mar. 2007, XP-050105413.
Motorola, "Contention-free Intra-LTE Handover," R2-070730, 3GPP TSG-RAN WG2 #57, Feb. 2007, XP-050133763.
Ericsson, "Scheduling Request in E-UTRAN," R1-070471, 3GPP TSG-RAN WG2 #47bis, Jan. 2007, XP-050104502.
NEC "Optimized Buffer Status Reporting" 3GPP TSG-RAN WG#2 58bis meeting R2-072515, Jun. 2007.
Catt et al. "Consideration on UL buffer reporting" 3GPP TSG RAN WG2#55, r2-062934, Oct. 2006.
Kashima, T., "Method and Apparatus for Providing Timing Alignment", U.S. Appl. No. 60/944,662, filed Jun. 18, 2007.
Lin, L.C., "Enhanced Random Access Response Formats in E-UTRA", U.S. Appl. No. 61/006,348, filed Jan. 8, 2008.
Ericsson, "Scheduling Request in E-UTRAN," 3GPP TSG-RAN #47bis, R1-070471, Jan. 2007.
Qualcomm Europe, "Further Details on RACH Procedure," 3GPP TSG-RAN WG1 #48, R1-070649, Feb. 2007.
NTT DoCoMo, Inc., "Buffer Status Report and Scheduling Request triggers," 3GPP TSG-RAN WG2 #59, R2-073574, Aug. 2007.
LG Electronics Inc., "Correction of status reporting coding," 3GPP TSG RAN WG2 #61, R2-080969, Feb. 2008, pp. 1-3, XP-002624626.
Alcatel-Lucent, "PDCP status report carrying LIS only," 3GPP TSG RAN WG2 #61, R2-080902, Jan. 2008, XP-050138711.
3rd Generation Partnership Project (3GPP), "Technical Specification Group Radio Access Network; Evolved Universal Terrestrial Radio Access (E-UTRA); Packet Data Convergence Protocol (PDCP) specification (Release 8)," 3GPP TS 36.323, V8.2.1, May 2008, pp. 1-25, XP-050377638.
LG Electronics, "Correction to PDCP Status Report," 3GPP TSG RAN WG2 #61bis, R2-081594, Mar. 2008, pp. 1-8, XP-002624627.
3rd Generation Partnership Project, "Technical Specification Group Radio Access Network; Evolved Universal Terrestrial Radio Access (E-UTRA) Radio Link Control (RLC) protocol specification (Release 8)", 3GPP TS 36.322, V8.0.0, Dec. 2007.
NTT DoCoMo Inc., "Miscellaneous corrections to TS 36.322", 3GPP TSG-RAN2 Meeting #61bis, R2-081700, Mar. 2008.
Ericsson, "Clarification to the handling of large RLC status reports", 3GPP TSG-RAN2 Meeting #61bis, R2-082018, Mar. 2008.
LG Electronics, et al., "ACK_SN setting for short Status PDU", 3GPP TSG-RAN WG2 #62, R2-082133, May 2008.
Cohen, "An Improved SSCOP-like Scheme for Avoiding Unnecessary Retransmissions and Achieving Ideal Throughput," Proceedings of IEEE Infocom Conference on Computer Communications, pp. 855-862, Mar. 1996, XP-010158150.
Qualcomm Europe, "General Corrections to RLC," 3GPP TSG-RAN Working Group 2 #22, Tdoc R2-011701, Jul. 2001, 12 pages.
LG Electronics Inc., "Out-of-sequence problem in AM RLC: Discretely discarded SDUs," 3GPP TSG-RAN WG2 Meeting #21, R2-011206, May 2001, 2 pages.

(56) References Cited

OTHER PUBLICATIONS

Japan Patent Office Application Serial No. 2012-151205, Office Action dated Apr. 16, 2013, 2 pages.
The State Intellectual Property Office of the People's Republic of China Application Serial No. 200880021003.6, Certificate dated Apr. 3, 2013, 15 pages.
United States Patent and Trademark Office U.S. Appl. No. 12/672,835, Final Office Action dated May 9, 2013, 16 pages.
Amitava Ghosh et al., "Random Access Design for UMTS Air-Interface Evolution", pp. 1041-1045, Apr. 2007.
The State Intellectual Property Office of the People's Republic of China Application Serial No. 200880107176.X, Certificate dated May 15, 2013, 15 pages.
Masson, "E-UTRA RACH within the LTE system," XP-002448009, Feb. 2006, 82 pages (relevant pp. 60 (numbered p. 42) and 61 (numbered p. 43)).
LG Electronics Inc., "RACH procedure," 3GPP TSG-RAN WG2 #59, R2-073043, XP-002515770, Aug. 2007, 3 pages.
LG Electronics, "Discussion on random access back-off procedure," 3GPP TSG-RAN WG2 #60bis, R2-080189, Jan. 2008, 5 pages.
3rd Generation Partnership Project (3GPP), Technical Specification Group Radio Access Network; Evolved Universal Terrestrial Radio Access (E-UTRA) Medium Access Control (MAC) protocol specification (Release 8), 3GPP TS 36.321 V8.0.0, XP-002520880, Dec. 2007, 23 pages.
European Patent Office Application Serial No. 09151778.9, Search Report dated Jun. 11, 2013, 8 pages.
United States Patent and Trademark Office U.S. Appl. No. 12/672,999, Final Office Action dated Jun. 6, 2013, 12 pages.
LG Electronics Inc., "Correction to Polling Procedure", R2-081588, 3GPP TSG-RAN WG2 #61 bis, Mar. 2008.
"Universal Mobile Telecommunications System (UMTS); Radio Link Control (RLC) protocol specification (3GPP TS 25.322 version 4.10.0 Release 4)", ETSI TS 125 322 V4.10.0, Sep. 2003, XP-014016803.
Zhang, et al., "Performance of UMTS Radio Link Control," Proceedings of IEEE International Conference on Communications, XP010590089, Apr. 2002, 5 pages.
3rd Generation Partnership Project (3GPP), "3rd Generation Partnership Project; Technical Specification Group Radio Access Network; Radio Link Control (RLC) protocol specification (Release 6)," 3GPP TS 25.322 V6.5.0, Sep. 2005, XP050129441, 79 pages (relevant portions: paragraphs [9.7.1], [11.3.2] and [11.3.2.1.1]).
European Patent Office Application Serial No. 08164559.0, Search Report dated Jun. 27, 2013, 8 pages.
LG Electronics, "Update of eUtran PDCP specification", R2-081390, 3GPP TSG-RAN2 Meeting #61, Jan. 2008.
Ericsson, "RLC status report format", R2-074701, TSG-RAN WG2 Meeting #60, Nov. 2007.
3rd Generation Partnership Project (3GPP); "Technical Specification Group Radio Access Network; Evolved Universal Terrestrial Radio Access (E-UTRA) Medium Access Control (MAC) protocol specification (Release 8)", 3GPP TS 36.321 V1.0.0, Sep. 2007.
3rd Generation Partnership Project (3GPP); "Technical Specification Group Radio Access Network; Medium Access Control (MAC) protocol specification (Release 7)", 3GPP TS 25.321 V7.5.0, Jun. 2007.
Chairman, "LTE User Plane session report", R2-074536, 3GPP TSG RAN WG2 #59bis, Oct. 2008.
ASUSTeK Computer Inc., "HFN de-synchronization detection with Integrity Protection scheme in a wireless communications system", U.S. Appl. No. 60/863,800.
NTT DoCoMo, Inc., "Uplink synchronization maintenance", R2-072014, 3GPP TSG RAN WG2 #58, May 2007, 4 pages, XP50134889.
European Patent Office Application Serial No. 08766423.1, Office Action dated Nov. 5, 2012, 5 pages.
United States Patent and Trademark Office U.S. Appl. No. 12/733,179, Office Action dated Oct. 31, 2012, 32 pages.
United States Patent and Trademark Office U.S. Appl. No. 13/441,698, Office Action dated Nov. 21, 2012, 31 pages.
United States Patent and Trademark Office U.S. Appl. No. 12/738,625, Office Action dated Oct. 24, 2012, 103 pages.
Alcatel-Lucent, "Format for RACH Message 2", 3GPP TSG RAN WG2 #60bis, R2-080176, Jan. 2008.
Motorola, "Design of Backoff Scheme for LTE", 3GPP TSG RAN WG2, Meeting #56bis, R2-070143, Jan. 2007.
Mac Rapporteurs, et al., "E-UTRA MAC Protocol Specification Update", 3GPP TSG RAN2 Meeting #60bis, R2-080631, Jan. 2008.
Zte, "Redundant Retransmission Restraint in RLC-AM," R2-061234, 3GPP TSG RAN WG2 Meeting #53, May 2006, XP-050131180.
European Telecommunications Standards Institute (ETSI), "Digital Cellular Telecommunications System (Phase 2+); Functional Stage 2 Description of Location Services (LCS) in GERAN (Release 7)," ETSI TS 143 059, v7.3.0, May 2007, XP-014038519.
National Office of Intellectual Property of Vietnam Application Serial No. 1-2010-00247, Office Action dated Feb. 26, 2013, 1 page.
United States Patent and Trademark Office U.S. Appl. No. 12/452,905, Office Action dated Dec. 3, 2012, 13 pages.
United States Patent and Trademark Office U.S. Appl. No. 12/922,538, Office Action dated Nov. 23, 2012, 12 pages.
State Intellectual Property Office of the People's Republic of China Application Serial No. 200980109358.5, Office Action dated Nov. 26, 2012, 6 pages.
3rd Generation Partnership Project; "Technical Specification Group Radio Access Network; Medium Access Control (MAC) protocol specification (Release 7)", 3GPP TS 25.321, V7.5.0, Jun. 2007.
3rd Generation Partnership Project; "Technical Specification Group Radio Access Network; Evolved Universal Terrestrial Radio Access (E-UTRA) Medium Access Control (MAC) protocol specification (Release 8)", 3GPP TS 36.321, V1.0.0, Sep. 2007.
Qualcomm Europe, "Scheduling request mechanism", R1-071276, 3GPP TSG-RAN WG1 #48bis, Mar. 2007.
Texas Instruments, "Scheduling Request and DRX in E-UTRA", R1-072859, 3GPP TSG RAN WG1 #49bis, Jun. 2007.
Ericsson, "SDU Discard", R2-073230, 3GPP TSG-RAN WG2 #59, Aug. 2007.
Nokia Siemens Networks, "Update on Security, System Information, Mobility, MBMS and DRX", R2-073863, 3GPP TSG-RAN2 Meeting #59, Aug. 2007.
NTT DoCoMo, Inc. et al., "MAC PDU structure for LTE", R2-074174, 3GPP TSG RAN WG2 #59bis, Oct. 2007.
Motorola, "MAC Header format", R2-074419, 3GPP TSG-RAN2 Meeting #59bis, Oct. 2007.
National Office of Intellectual Property of Vietnam Application No. 1-2010-00637, Notice of Allowance dated Mar. 28, 2013, 1 page.
NEC, "Considerations on Scheduling Information", R2-073556, 3GPP TSG-RAN WG2#59, Aug. 2007.
ITRI, "Buffer Status Reporting with Group Combining for LTE", R2-072833, 3GPP TSG-RAN-WG2 Meeting #58bis, Jun. 2007.
ASUSTeK, "On-line recovery of HFN synchronization due to RLC UM SN problem", R2-041940, 3GPP TSG-RAN WG2 meeting #44, Oct. 2004.
Rapporteur (ASUSTeK), "Summary of HFN de-synchronization problem off-line email discussion", R2-050318, 3GPP TSG RAN WG2 #46, Feb. 2005.
United States Patent and Trademark Office U.S. Appl. No. 12/452,905, Final Office Action dated Apr. 11, 2013, 20 pages.
United States Patent and Trademark Office U.S. Appl. No. 12/452,733, Final Office Action dated Jan. 8, 2013, 19 pages.
Catt, "Notification scheme for system information Change", R2-071870, 3GPP TSG-RAN WG2#58, May 2007, 5 pages.
LG Electronics Inc., "Discussion on BCCH Update", R2-072736, 3GPP TSG-RAN WG2 #58bis, Jun. 2007, 3 pages.
European Patent Office Application Serial No. 08011263.4, Search Report dated Dec. 7, 2012, 8 pages.
United States Patent and Trademark Office U.S. Appl. No. 13/107,232, Notice of Allowance dated Jan. 30, 2013, 17 pages.
National Office of Intellectual Property of Vietnam Application Serial No. 1-2010-00246, Office Action dated Jan. 25, 2013, 2 pages.
United States Patent and Trademark Office U.S. Appl. No. 12/671,020, Notice of Allowance dated Feb. 14, 2013, 13 pages.

(56) References Cited

OTHER PUBLICATIONS

United States Patent and Trademark Office U.S. Appl. No. 13/107,329, Office Action dated Feb. 15, 2013, 10 pages.
The State Intellectual Property Office of the People's Republic of China Application Serial No. 200980100119.3, Office Action dated Feb. 5, 2013, 14 pages.
3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.2.0, May 2008, 33 pages.
ASUSTeK, "Minor corrections to 36.321," 3GPP TSG-RAN WG2 Meeting #67, R2-095152, Aug. 2009, 6 pages.
United States Patent and Trademark Office U.S. Appl. No. 12/733,179, Final Office Action dated Apr. 18, 2013, 21 pages.
United States Patent and Trademark Office U.S. Appl. No. 12/672,835, Office Action dated Sep. 11, 2013, 16 pages.
National Office of Intellectual Property of Vietnam Application No. 1-2010-01256, Office Action dated Sep. 26, 2013, 1 page.
Qualcomm Europe, "L2 improvements and polling," 3GPP TSG-RAN WG2 #58, R2-072021, May 2007, 3 pages.
Japan Patent Office Application Serial No. 2012-041575, Office Action dated Aug. 27, 2013, 2 pages.
The State Intellectual Property Office of the People's Republic of China Application Serial No. 200880021023.3, Certificate dated Jul. 31, 2013, 17 pages.
The State Intellectual Property Office of the People's Republic of China Application Serial No. 200980100119.3, Office Action dated Aug. 13, 2013, 14 pages.
3rd Generation Partnership Project (3GPP), "Technical Specification Group Radio Access Network; Evolved Universal Terrestrial Radio Access (E-UTRA) Radio Link Control (RLC) protocol specification (Release 8)," 3GPP TS 36.322 V8.0.0, Dec. 2007, 9 pages.
United States Patent and Trademark Office U.S. Appl. No. 13/431,795, Office Action dated Oct. 4, 2013, 11 pages.
European Patent Office Application Serial No. 08164607.7, Search Report dated Jul. 12, 2013, 8 pages.
3rd Generation Partnership Project (3GPP), "3rd Generation Partnership Project; Technical Specification Group Radio Access Network; Radio Link Control (RLC) protocol specification (Release 7)," 3GPP TS 25.322 V7.3.0, Jun. 2007, XP050367795, 81 pages (relevant portions: sections [4.2.1], [9.5], [9.7.3] and [11.6]).
United States Patent and Trademark Office U.S. Appl. No. 13/541,574, Office Action dated Oct. 23, 2013, 6 pages.
European Patent Office Application Serial No. 09151792.0, Search Report dated Nov. 7, 2013, 8 pages.
3GPP TS 25.331 V6.6.0, Release 6, Jun. 2005, 1153 pages.
Korean Intellectual Property Office Application Serial No. 10-2007-0082382, Notice of Allowance dated Nov. 1, 2013, 2 pages.

* cited by examiner short buffer status MAC control element normal buffer status MAC control element

METHOD OF EFFECTIVELY TRANSMITTING RADIO RESOURCE ALLOCATION REQUEST IN MOBILE COMMUNICATION SYSTEM

CROSS-REFERENCE TO RELATED PATENT APPLICATIONS

Pursuant to 35 U.S.C. §119, this application claims the benefit of earlier filing date and right of priority to U.S. Provisional Application Ser. Nos. 60/974,072 filed on Sep. 20, 2007, 60/975,582 filed on Sep. 27, 2007, 60/976,766 filed on Oct. 1, 2007, and 61/039,095 filed on Mar. 24, 2008, and Korean Application No. 10-2008-0091724, filed on Sep. 18, 2008, the contents of which are hereby incorporated by reference herein in their entirety.

BACKGROUND OF THE INVENTION

1. Field of the Invention

The present invention relates to a wireless communication system providing wireless communications and a mobile terminal, and particularly, to a method allowing a terminal with data to be transmitted in an uplink direction to transmit a radio resource allocation request message to a base station by effectively using radio resource(s) to its maximum level. More particularly, the present invention relates to a method allowing the terminal to select a radio resource allocation request message of a proper format according to a situation of radio resource(s) or the amount of data of each channel and transmit the same to the base station.

2. Description of the Related Art

FIG. 1 shows a network structure of the E-UMTS, a mobile communication system, applicable to the related art and the present invention. The E-UMTS system has been evolved from a UMTS system, for which the 3GPP is proceeding with the preparation of the basic specifications applicable thereto. The E-UMTS system may be classified as an LTE (Long Term Evolution) system.

The E-UMTS network may be divided into an E-UTRAN and a core network (CN). The E-UTRAN includes a terminal (referred to as 'UE (User Equipment), hereinafter), a base station (referred to as an eNode B, hereinafter), and an access gateway (AG) located at an end of a network and connected with an external network. The AG may be divided into a part handling processing of user traffic and a part processing control traffic. In this case, the AG for processing user traffic and the AG processing control traffic may communicate with each other by using a new interface. One or more cells may exist for a single eNode B. An interface for transmitting the user traffic or the control traffic may be used between eNodes. The CN may include a node for registering an AG and a user of a UE. An interface for discriminating the E-UTRAN and the CN may be used.

Layers of a radio interface protocols between the terminal (UE) and the network can be divided into a first layer (L1), a second layer (L2), and a third layer (L3) based on three lower layers of an open system interconnection (OSI) standard model widely known in communication systems. A physical layer belonging to the first layer (L1) provides an information transfer service using a physical channel, and an RRC (Radio Resource Control) layer positioned at the third layer serves to control radio resource(s) between the terminal and the network. To this end, the RRC layer exchanges an RRC message between the terminal and the network. The RRC layer may be distributively positioned at network nodes such as the eNode B, the AG, etc., or may be positioned only at the eNode B or at the AG.

FIG. 2 illustrates a radio interface protocol architecture based on a 3GPP radio access network specification between the terminal and the base station. The radio interface protocol has horizontal layers comprising a physical layer, a data link layer, and a network layer, and has vertical planes comprising a user plane for transmitting user information and a control plane for transmitting control signals (signaling). The protocol layers can be divided into the first layer (L1), the second layer (L2), and the third layer (L3) based on three lower layers of an open system interconnection (OSI) standard model widely known in communication systems.

The radio protocol control plane in FIG. 2 and each layer of the radio protocol user plane in FIG. 3 will now be described.

The physical layer, namely, the first layer (L1), provides an information transfer service to an upper layer by using a physical channel. The physical layer is connected to an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via the physical channel.

The MAC layer of the second layer provides a service to a radio link control (RLC) layer, its upper layer, via a logical channel. The RLC layer of the second layer may support reliable data transmissions. The function of the RLC layer may be implemented as a function block in the MAC. In this case, the RLC layer may not exist. A PDCP layer of the second layer performs a header compression function for reducing the size of a header of an IP packet including sizable unnecessary control information, whereby an IP packet such as IPv4 or IPv6 can be effectively transmitted in a radio interface with a relatively small bandwidth.

A radio resource control (RRC) layer located at the lowest portion of the third layer is defined only in the control plane, and handles the controlling of logical channels, transport channels and physical channels in relation to configuration, reconfiguration and release of radio bearers (RBs). The radio bearer refers to a service provided by the second layer (L2) for data transmission between the terminal and the UTRAN.

A downlink transport channel transmitting data from the network to the terminal includes a BCH (Broadcast Channel) that transmits system information and a downlink SCH (Shared Channel) that transmits user traffic or a control message. Traffic or a control message of a downlink multicast or broadcast service may be transmitted via the downlink SCH or a downlink MCH (Multicast Channel). An uplink transport channel transmitting from the terminal to the network may include an RACH (Random Access Channel) that transmits an initial control message and an uplink SCH that transmits user traffic or a control message. A general method for receiving data by the terminal in the LTE system will now be described.

The base station and the terminal mostly transmit and receive data via a physical channel PDSCH (Physical Downlink Shared Channel0 using a transport channel DL-SCH, except for a particular control signal or particular service data. Information about a terminal (one or more terminals) to which data of the PDSCH is to be transmitted, information about how the terminals receive the PDSCH data, information about how the PDSCH data is to be received or decoded, or the like are included in a PDCCH (Physical Downlink Control Channel) and transmitted.

For example, it is assumed that a particular PDCCH including information regarding data, which is CRC-masked with an RNTI (Radio Network Temporary Identity (or Identifier)) of 'A' and transmitted via transmission format information (e.g., a transmission block size, a modulation and coding information, etc.) of 'C' via radio resource (e.g., a frequency position) of 'B', is transmitted in a particular sub-frame. Then, one or two or more terminals located in a corresponding cell monitor the PDCCH by using RNTI information of their own, and if they have the 'A RNTI' at a corresponding point of time, the terminals would receive the PDCCH and also receives the PDSCH indicated by 'B' and 'C' via the information of the PDCCH.

In this process, the RNTI is transmitted in order to information about to which terminals allocation information of radio resource(s) transmitted via each PDCCH is pertinent. The RNTI includes a dedicated RNTI and a common RNTI. The dedicated RNTI is used to transmit/receive data to/from a particular terminal, and used by the terminal when information of the terminal is registered in the base station. Meanwhile, the common RNTI is used to transmit or receive data to or from terminals that have not been allocated a dedicated RNTI because their information was not registered to the base station, or transmit information, such as system information, commonly used by a plurality of terminals. For example, an RA-RNTI or a T-C-RNTI in the RACH process is the common RNTI.

As mentioned above, the base station and the terminal(s) are two main entities that constituting the E-UTRAN. Radio resource(s) include uplink radio resource and downlink radio resource in a cell. The base station handles allocation and controlling of the uplink radio resource and the downlink resource in the cell. Namely, the base station determines which terminal uses which radio resource(s) in a certain moment. For example, the base station may determine that frequency 100 MHz to 101 MHz is allocated to a user No. 1 to transmit downlink data for 0.2 seconds after 3.2 seconds. After such determination, the base station may inform the corresponding terminal accordingly to allow the terminal to receive downlink data. Also, the base station determines when and which terminal would transmit data in an uplink direction by using which and how much radio resource(s), and allows a corresponding terminal to transmit data during the corresponding time. Such dynamic management of radio resource(s) by the base station is effective, compared with the related art in which a single terminal keeps using a single radio resource while a call is in connection. This is irrational in the aspect that, recently, many services are based on IP packets. That is, most packet services do not constantly generate packets during a call-connected time but there are many sections during which nothing is transmitted, and in this sense, constantly allocating radio resource(s) to a single terminal would be ineffective. Thus, the E-UTRAN system employs the method of allocating radio resource(s) to the terminal only when the terminal requires them or only while there is service data.

In the LTE system, in order to effectively use radio resource(s), the base station should know which data each user waits for. In case of data to downlink, the downlink data is transferred from the access gateway. Namely, the base station knows how much data should be transmitted to each user via the downlink. Meanwhile, in case of data to uplink, if each terminal does not inform the base station about data it intends to directly transmit to uplink, the base station could not know how much uplink radio resource(s) each terminal requires. Thus, for a proper uplink radio resource allocation, each terminal should provide information required for scheduling of radio resource(s) to the base station.

Namely, if a terminal has data to be transmitted, it informs the base station about that, and the base station then transmits a radio resource allocation message to the terminal based on the information.

In this case, when the terminal informs the base station that it has data to be transmitted, actually, the terminal informs the base station about the amount of data gathered in its buffer. It is called a buffer status report (BSR).

As stated above, if a terminal has data in its buffer and certain conditions are met, the terminal is to transmit a BSR to the base station.

In this respect, however, the BSR has no direct connection with user data, which the terminal and the base station actually want to exchange. Namely, the BSR is used to merely transfer information required for effectively allocating radio resource(s) to the terminal by the base station, rather than transferring actual user data.

Thus, it is better to have the smaller the BSR, thereby reducing a waste of radio resource(s) used for transmitting the BSR. Namely, the BSR is preferred to be as simple as possible.

There are several logical channels for a single terminal, and each logical channel has a different priority level. For example, in case of an SRB (Signaling Radio Bearer) used for exchanging an RRC message by the base station and the terminal, if there is data in the SRB, the terminal should inform the base station accordingly as soon as possible, and in this case, the base station should allocate radio resource(s) to the terminal more preferentially. Meanwhile, if there is data in a logical channel for a VoIP (Voice over Internet Protocol) and if there are other terminals than the terminal, the terminals having channels set with a priority level higher than the VoIP, and there is data in the channels with the higher priority level in the cell, the terminal would not need to quickly transmit the BSR to the base station and the base station also would not need to immediately allocate radio resource(s) to the terminal. Thus, the BSR would be better to be as accurate as possible in consideration of a difference of each channel. Namely, in this case, as the BSR becomes large, it can include more detailed information, which promotes an improvement of performance at the side of a scheduler of the base station.

Thus, a method for effectively informing the base station about a buffer status of the terminal while satisfying the two conflicting conditions is required.

SUMMARY OF THE INVENTION

Therefore, in order to address the above matters, the various features described herein have been conceived. One aspect of the exemplary embodiments is to provide a method whereby a terminal transmits a radio resource allocation request message to a base station by effectively using radio resource(s) to its maximum level, for which the terminal selects a radio resource allocation request message of a proper format according to a status of radio resource(s) or the amount of data of each channel set for the terminal and transmits the same to the base station.

This specification provides a method for communicating data in a wireless communication system, including: defining a plurality of buffer status report (BSR) formats for a transmission of a BSR; selecting one of the plurality of BSR formats based on particular conditions; generating the BSR according to the selected BSR format; and transmitting the generated BSR.

The foregoing and other objects, features, aspects and advantages of the present invention will become more apparent from the following detailed description of the present invention when taken in conjunction with the accompanying drawings.

DETAILED DESCRIPTION OF THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In general, a terminal (or UE) may perform a random access procedure in the following cases: 1) when the terminal performs an initial access because there is no RRC Connection with a base station (or eNB), 2) when the terminal initially accesses to a target cell in a handover procedure, 3) when it is requested by a command of a base station, 4) when there is uplink data transmission in a situation where uplink time synchronization is not aligned or where a specific radio resource used for requesting radio resources is not allocated, and 5) when a recovery procedure is performed in case of a radio link failure or a handover failure.

In the LTE system, the base station allocates a dedicated random access preamble to a specific terminal, and the terminal performs a non-contention random access procedure which performs a random access procedure with the random access preamble. In other words, there are two procedures in selecting the random access preamble: one is a contention based random access procedure in which the terminal randomly selects one within a specific group for use, another is a non-contention based random access procedure in which the terminal uses a random access preamble allocated only to a specific terminal by the base station. The difference between the two random access procedures is that whether or not a collision problem due to contention occurs, as described later. And, the non-contention based random access procedure may be used, as described above, only in the handover procedure or when it is requested by the command of the base station.

Figure 1:
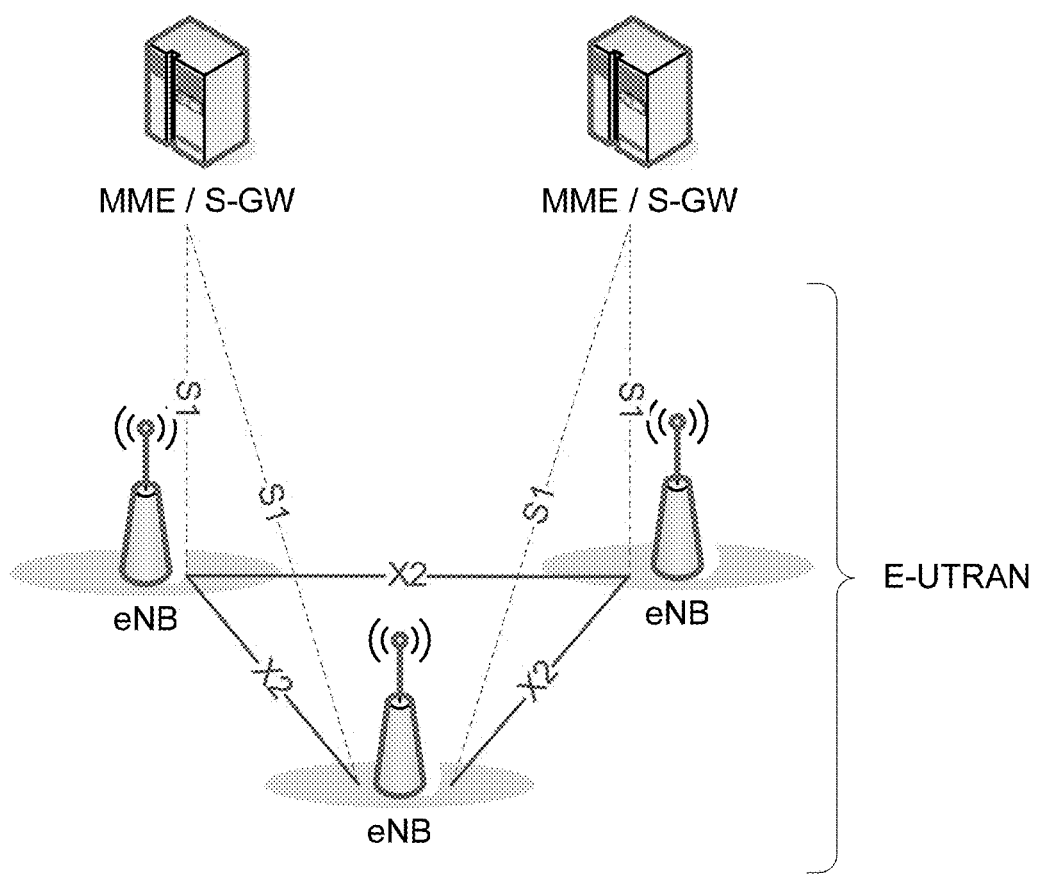
FIG. 1 shows a network structure of an E-UMTS, a mobile communication system, applicable to the related art and the present invention.
Figure 2:
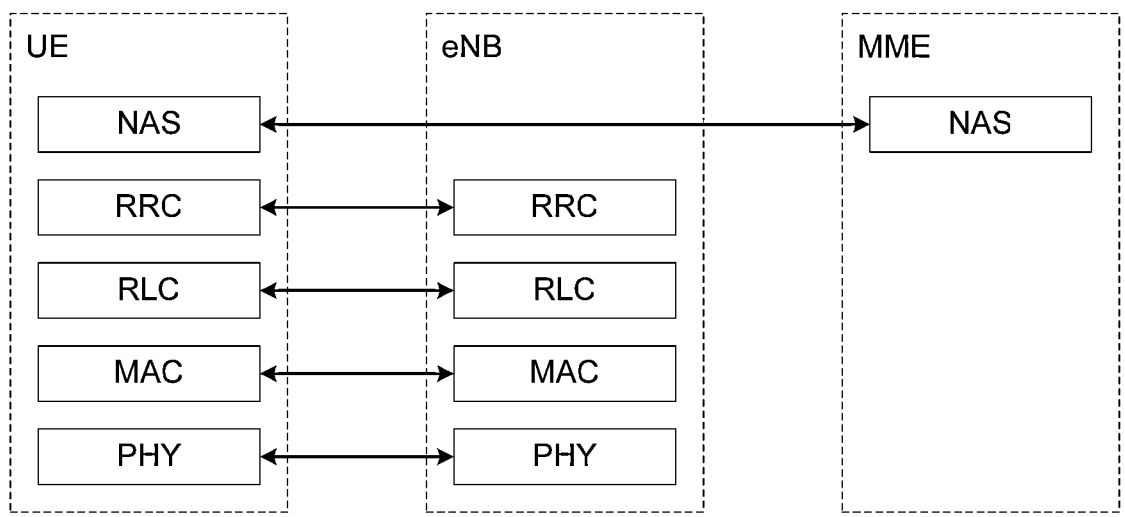
FIG. 2 shows an exemplary structure of a control plane of a radio interface protocol between a UE and a UTRAN based on the 3GPP radio access network standards.
Figure 3:
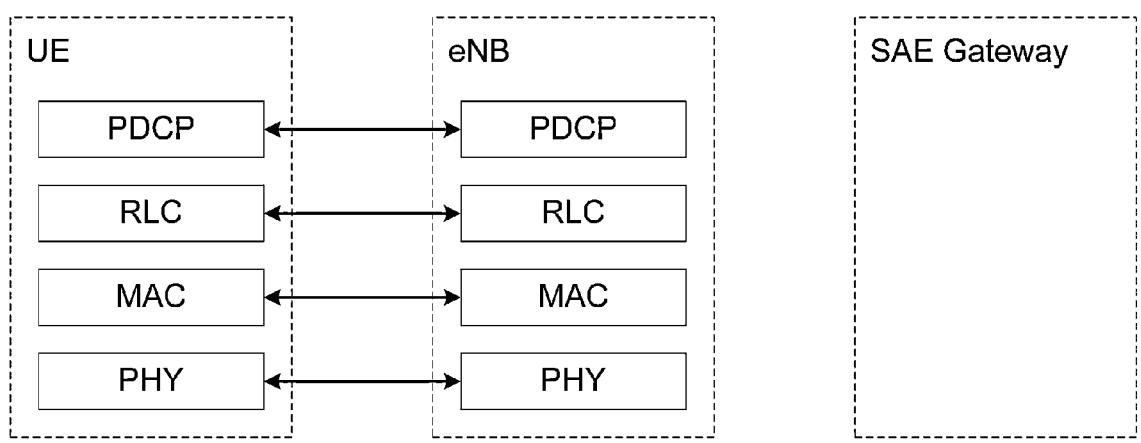
FIG. 3 shows an exemplary structure of a user plane of the radio interface protocol between the UE and the UTRAN based on the 3GPP radio access network standards.
Figure 4:
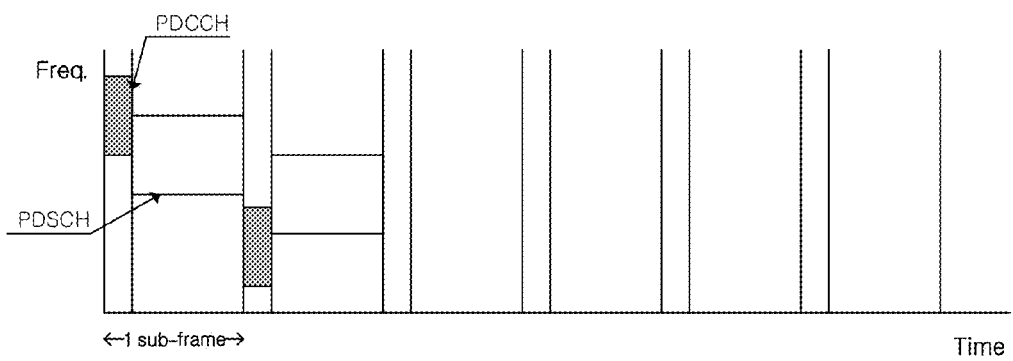
FIG. 4 is a view showing a radio resource allocation according to the related art.
Figure 5:
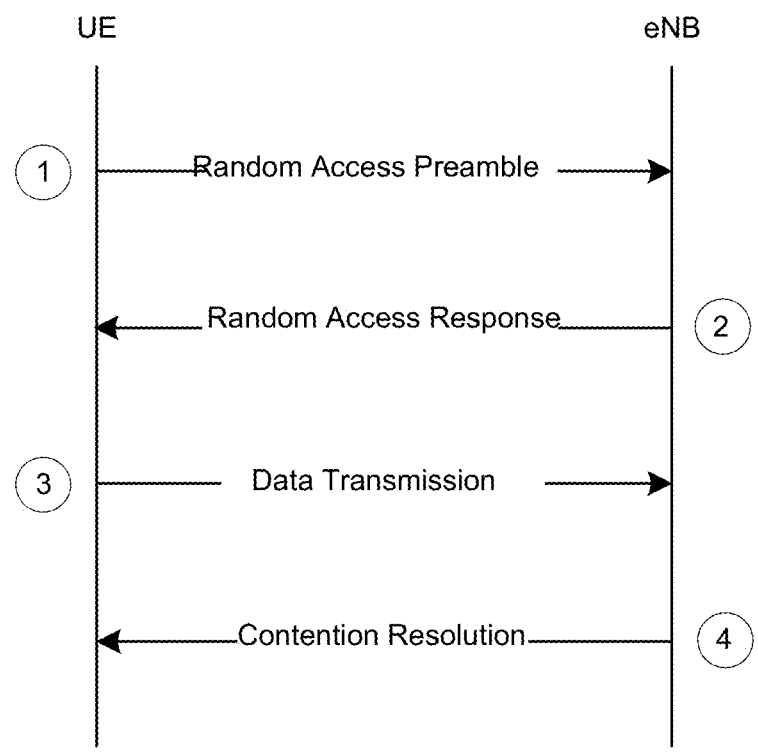
FIG. 5 shows an exemplary view of a contention based random access procedure.

Based on the above description, FIG. 5 shows an operation procedure between a terminal and a base station in a contention based random access procedure.

First, a terminal in the contention based random access randomly may select a random access preamble within a group of random access preambles indicated through system information or a handover command, may select PRACH resources capable of transmitting the random access preamble, and then may transmit the selected random access preamble to a base station (Step 1).

After transmitting the random access preamble, the terminal may attempt to receive a response with respect to its random access preamble within a random access response reception window indicated through the system information or the handover command (Step 2). More specifically, the random access response information is transmitted in a form of MAC PDU, and the MAC PDU may be transferred on the Physical Downlink Shared Channel (PDSCH). In addition, the Physical Downlink Control Channel (PDCCH) is also transferred such that the terminal appropriately receives information transferred on the PDSCH. That is, the PDCCH may include information about a terminal that should receive the PDSCH, frequency and time information of radio resources of the PDSCH, a transfer format of the PDSCH, and the like. Here, if the PDCCH has been successfully received, the terminal may appropriately receive the random access response transmitted on the PDSCH according to information of the PDCCH. The random access response may include a random access preamble identifier (ID), an UL Grant, a temporary C-RNTI, a Time Alignment Command, and the like. Here, the random access preamble identifier is included in the random access response in order to notify terminals to which information such as the UL Grant, the temporary C-RNTI, and the Time Alignment Command would be valid (available, effective) because one random access response may include random access response information for one or more terminals. Here, the random access preamble identifier may be identical to the random access preamble selected by the terminal in Step 1.

If the terminal has received the random access response valid to the terminal itself, the terminal may process each of the information included in the random access response. That is, the terminal applies the Time Alignment Command, and stores the temporary C-RNTI. In addition, the terminal uses the UL Grant so as to transmit data stored in a buffer of the terminal or newly generated data to the base station (Step 3). Here, a terminal identifier should be essentially included in the data which is included in the UL Grant (message 3). This is because, in the contention based random access procedure, the base station may not determine which terminals are performing the random access procedure, but later the terminals should be identified for contention resolution. Here, two different schemes may be provided to include the terminal identifier. A first scheme is to transmit the terminal's cell identifier through the UL Grant if the terminal has already received a valid cell identifier allocated in a corresponding cell prior to the random access procedure. Conversely, the second scheme is to transmit the terminal's unique identifier (e.g., S-TMSI or random ID) if the terminal has not received a valid cell identifier prior to the random access procedure. In general, the unique identifier is longer than the cell identifier. In Step 3, if the terminal has transmitted data through the UL Grant, the terminal starts the contention resolution timer.

After transmitting the data with its identifier through the UL Grant included in the random access response, the terminal waits for an indication (instruction) of the base station for the contention resolution. That is, the terminal attempts to receive the PDCCH so as to receive a specific message (Step 4). Here, there are two schemes to receive the PDCCH. As described above, if the terminal identifier transmitted via the UL Grant is the cell identifier, the terminal attempts to receive the PDCCH by using its own cell identifier. If the terminal identifier transmitted via the UL Grant is its unique identifier, the terminal attempts to receive the PDCCH by using the temporary C-RNTI included in the random access response. Thereafter, for the former, if the PDCCH (message 4) is received through its cell identifier before the contention resolution timer is expired, the terminal determines that the random access procedure has been successfully (normally) performed, thus to complete the random access procedure. For the latter, if the PDCCH is received through the temporary cell identifier before the contention resolution timer is expired, the terminal checks data (message 4) transferred by the PDSCH that the PDCCH indicates. If the unique identifier of the terminal is included in the data, the terminal determines that the random access procedure has been successfully (normally) performed, thus to complete the random access procedure.

The present invention provides a method whereby a terminal may effectively provide information about the amount of data gathered in its buffer while minimizing the amount of radio resource(s) required for transmitting a buffer status report (BSR).

To this end, in the present invention, a plurality of BSR formats are defined, the terminal selects one of the plurality of BSR formats according to its situation, configures (generates) a BSR according to the selected BSR format, and transmits it to a base station. In detail, in the present invention, two BSR formats are defined: one of them is a normal BSR and the other is a shortened BSR. If the terminal is allocated radio resource(s) enough to transmit the normal BSR, if there is enough room or space in allocated radio resource(s) to include the normal BSR, or if an uplink radio resource is allocated enough to include information with respect to all configured channels or all configured channel groups, the normal BSR may be included in a MAC PDU and this may be transmitted to the base station via the allocated radio resource(s). If the terminal is allocated radio resource(s) which are, however, not enough to transmit the normal BSR, if there is not enough room or space in allocated radio resource(s) to include the normal BSR, or if an uplink radio resource is allocated not enough to include information with respect to all configured channels or all configured channel groups the shortened BSR may be included in a MAC PDU and this may be transmitted to the base station via the allocated radio resource(s).

Logical channels set for the terminal may be divided into maximum of four logical channel groups. Namely, the base station and the terminal may define maximum of four logical channel groups, and each logical channel may be belonged to one of the set logical channel groups. The terminal may obtain the sum of data gathered in its buffers of each channel by logical channel groups and may transfer the same to the base station. Namely, the terminal does not transmit the amount of buffers gathered in each channel to the base station but obtains the sum of the buffers stored in each channel belonging to the logical channel groups and transmits the corresponding sum information to the base station. The present invention is to effectively support such a structure. As such, the normal BSR may include all buffer information about every set channel or every logical channel groups, and the shortened BSR may include some or only a portion of buffer information about every set channel or every logical channels. Here, the normal BSR may include a BSR of each channel set for the terminal, and the shortened BSR may include a BSR of some of all the channels set for the terminal. Also, the normal BSR may include a BSR of each logical channel group set for the terminal and the shortened BSR may include a BSR of some of all the logical channel groups set for the terminal.

For example, if the terminal with buffers storing data performs a random access procedure in order to transmit a BSR to the base station, the allocated radio resource(s) may be allocated by the base station for transmitting of an RACH message 3. In this case, if the allocated radio resource(s) are sufficient enough, the terminal may configure the normal BSR and transmits it. If, however, the allocated radio resource(s) are not sufficient enough, namely, if the allocated radio resource(s) are not enough to include the normal BSR, the terminal may configure the shortened BSR and transmits it. Namely, according to the present invention, the terminal may transmit the normal BSR or the shortened BSR according to the amount of allocated radio resource(s).

Figure 6:
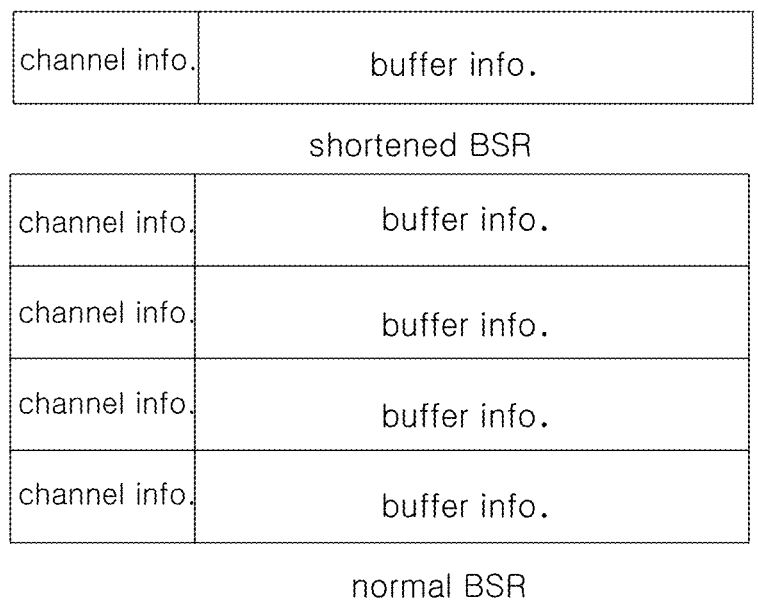
FIG. 6 is a view showing a plurality of buffer status report (BSR) formats used for transmitting a BSR to a base station by a terminal according to an embodiment of the present invention.

FIG. 6 is a view showing a plurality of buffer status report (BSR) formats used for transmitting a BSR to a base station by the terminal according to an embodiment of the present invention. As shown in FIG. 6, it is assumed that a total of four channels are set for the terminal and an upper portion shows the shortened BSR and the lower portion shows the normal BSR. Because it is assumed that there are a total of four buffers, the normal BSR informs about a status of buffers of every channel, and the shortened BSR informs about a status about a portion of them, e.g., only a buffer of a single channel. The shortened BSR according to the present invention can be applicable for a case where there is not much radio resource(s) to be allocated to the terminal like in the RACH procedure or process, a case where the normal BSR is larger than the amount of allocated radio resource(s) or the amount of data that can be transmitted by the radio resource(s), or a case where information about buffers cannot be included because there is so much data in other channels set for the terminal.

The buffer status reporting (BSR) procedure is used to provide a serving base station (e.g. eNB) with information about the amount of data in the uplink buffers of the terminal (e.g. UE). Here, the Buffer Status Report (BSR) may be triggered (FIG. 8) if any of the following events occur: 1) uplink data arrives in the terminal's transmission buffer and the data belongs to a logical channel with higher priority than those for which data already existed in the terminal's transmission buffer, in which case the BSR is referred below to as "Regular BSR"; 2) uplink resources are allocated and number of padding bits is larger than the size of the Buffer Status Report MAC (Medium Access Control) control element, in which case the BSR is referred below to as "Padding BSR"; 3) a serving cell change occurs, in which case the BSR is referred below to as "Regular BSR"; 4) the periodic BSR timer expires, in which case the BSR is referred below to as "Periodic BSR".

Figure 8:
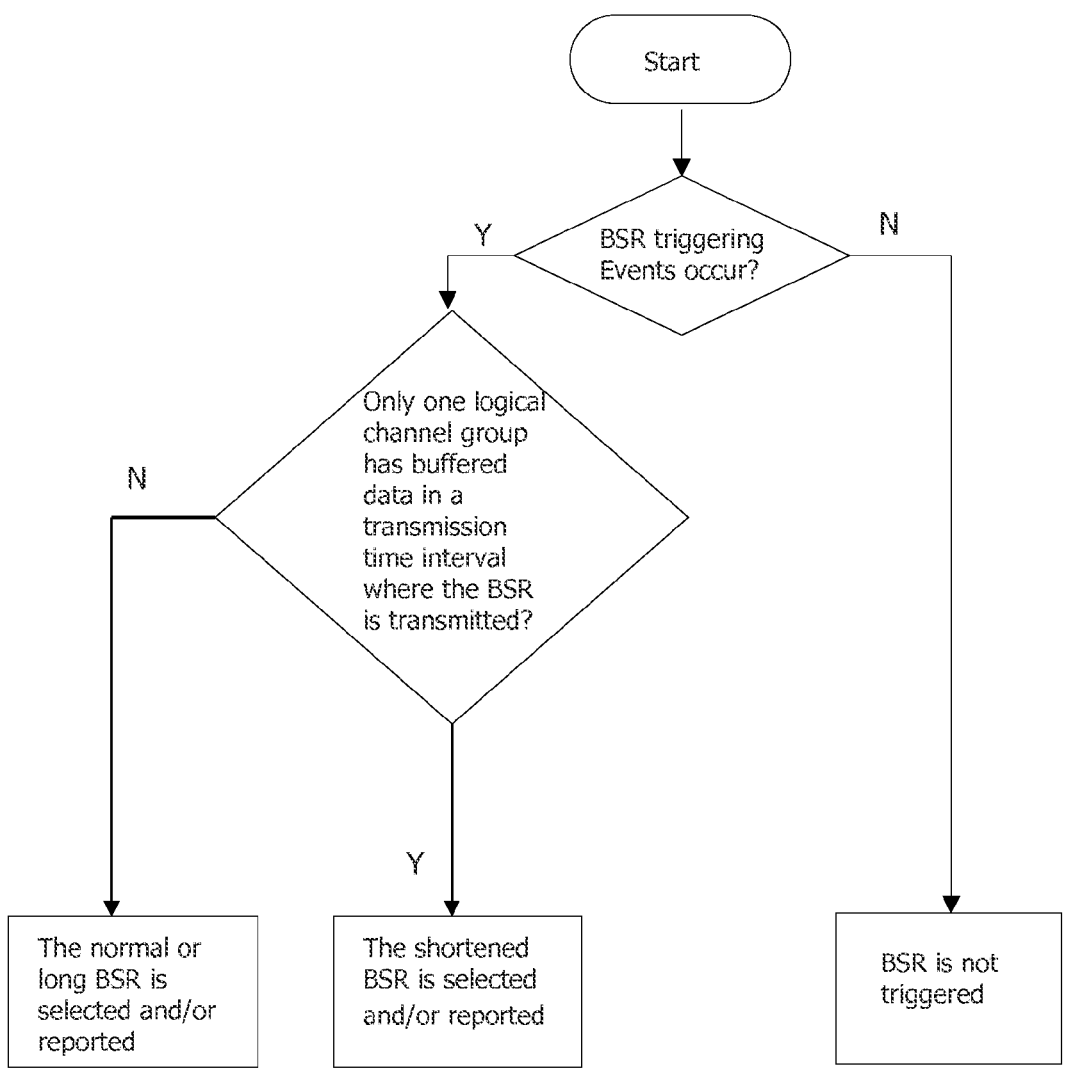
FIG. 8 shows a method for determining a BSR format to be selected for transmitting the BSR.

Referring to FIG. 8 for Regular and Periodic BSR: the shortened BSR may be reported if only one logical channel group (LCG) has buffered data in the transmission time interval (TTI) where the BSR is transmitted, and the long or normal BSR may be reported if more than one LCG has buffered data in the TTI where the BSR is transmitted: report long BSR. For padding BSR: the shortened BSR of the LCG with the highest priority logical channel with buffered data may be reported if the number of padding bits is equal to or larger than the size of the Short BSR but smaller than the size of the Long BSR, and the long or normal BSR may be reported if the number of padding bits is equal to or larger than the size of the Long BSR. Also, Buffer Status Report (BSR) MAC control elements may consist of a short BSR format and a long BSR format.

Figure 7:
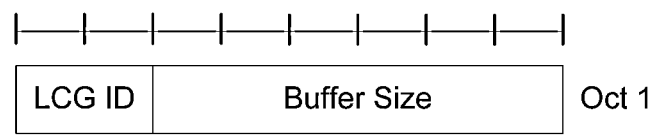
FIG. 7 shows exemplary formats of short buffer status report and long buffer status of a MAC Control Element according to an embodiment of the present invention.
Figure 7:
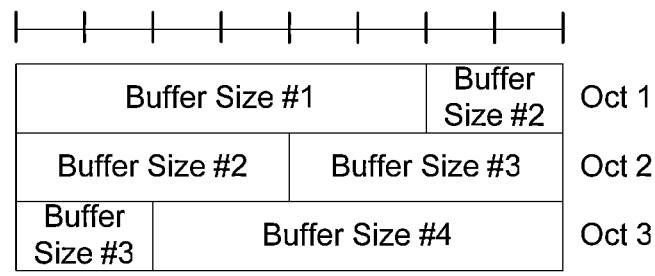

FIG. 7 shows exemplary formats of short buffer status report and long buffer status report according to the present invention. As illustrated in FIG. 7, for example, the short BSR format may include one LCG ID field and one corresponding Buffer Size (BS) field, and the long BSR format may include four BS fields, corresponding to each of LCG IDs. Here, the BSR formats may be identified by MAC PDU sub-headers with LCIDs. The fields of LCG ID and BS may be defined as follow: 1) LCG ID: The Logical Channel Group ID field identifies the group of logical channel(s) which buffer status is being reported. The length of this field may be 2 bits; 2) Buffer Size: The Buffer Size field identifies the total amount of data available across all logical channels of a logical channel group after the MAC PDU has been built. The amount of data is indicated in number of bytes. It may include all data that is available for transmission in the RLC layer and in the PDCP layer. The size of the RLC and MAC headers may be not considered in the buffer size computation. The length of this field may be 6 bits.

As so far described, the present invention provides a plurality of BSR formats, based on which the terminal can selected a proper BSR in consideration of a channel status or a data status and transmit the same to the base station, to thus effectively use radio resource(s).

The present invention may provide a Method for communicating data in a wireless communication system, the method comprising: defining a plurality of buffer status report (BSR) formats for a transmission of a BSR; selecting one of the plurality of BSR formats based on a certain condition; generating a BSR according to the selected buffer status report format; and transmitting the generated BSR, wherein the plurality of BSR formats comprise a normal BSR and a shortened BSR, the normal BSR is selected if an uplink radio resource is allocated enough to include information with respect to all configured channels or all configured channel groups, the shortened BSR is selected if an uplink radio resource is allocated not enough to include information with respect to all configured channels or all configured channel groups, the normal BSR includes buffer information about every channel set for the terminal, the normal BSR includes buffer information about every logical channel or logical channel group set for the terminal, the shortened BSR includes buffer information about some of all the channels set for the terminal, the shortened BSR comprises buffer information about every logical channel, some channels or some channel groups of logical channel groups, and the shortened BSR is used while the random access procedure is performed.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for communicating data in a wireless communication system, the method comprising:

selecting a buffer status report (BSR) format from a plurality of BSR formats for a transmission of a BSR;

generating a BSR according to the selected BSR format; and transmitting the generated BSR via a terminal, wherein a first BSR format is selected when only one logical channel group (LCG) has buffered data in the transmission time interval (TTI) in which the BSR is transmitted, wherein a second BSR format is selected when more than one LCG has buffered data in the TTI in which the BSR is transmitted, wherein an LCG identifier (LCG ID) field identifies one or more groups of logical channels for which buffer status is being reported, wherein the first BSR format is a shortened BSR and the second BSR format is a normal BSR, wherein the shortened BSR includes one LCG ID field and one corresponding buffer size (BS) field, wherein a length of the LCG ID field in the shortened BSR is two bits, wherein the BS field in the shortened BSR identifies a total amount of data available across all logical channels of the one LCG in the shortened BSR, and wherein the terminal obtains a sum of buffered data stored in each logical channel belonging to the one LCG and transmits the corresponding sum to a base station.

2. The method of claim 1, wherein the normal BSR includes buffer information about every channel set for the terminal.

3. The method of claim 1, wherein the normal BSR includes buffer information about every logical channel set or an LCG set for the terminal.

4. The method of claim 1, wherein the shortened BSR further includes buffer information about a portion of every channel set for the terminal.

5. The method of claim 1, wherein the shortened BSR further includes at least a portion of buffer information related to every channel set or every logical channel set for the terminal, a BSR of a portion of every channel set for the terminal, or a BSR of a portion of every LCG set for the terminal.

6. The method of claim 1, wherein the shortened BSR is used while a random access procedure is performed.

7. The method of claim 1, wherein the normal BSR includes two or more buffer size (BS) fields corresponding to each LCG ID.

* * * * *